United States Patent [19]

Ungarsohn

[11] Patent Number: 5,408,213

[45] Date of Patent: Apr. 18, 1995

[54] PORTABLE BREAKAWAY ALARM SYSTEM

[76] Inventor: Benjamin I. Ungarsohn, 2911 Charlotte Dr., Merrick, N.Y. 11566

[21] Appl. No.: 60,863

[22] Filed: May 12, 1993

[51] Int. Cl.$^6$ .................. B60R 25/10; G08B 13/08
[52] U.S. Cl. ................... 340/427; 340/542; 340/543; 340/546; 340/547; 340/548; 340/568
[58] Field of Search ............ 340/425.5, 426, 427, 340/432, 551, 568, 571, 542, 543, 546, 547, 548

[56] References Cited

U.S. PATENT DOCUMENTS

| | | | |
|---|---|---|---|
| 3,824,540 | 7/1974 | Smith, II | 340/427 |
| 4,536,754 | 8/1985 | Holce et al. | 340/568 |
| 4,804,943 | 2/1989 | Soleimani | 240/539 |
| 4,833,456 | 5/1989 | Heller | 340/571 |
| 4,853,692 | 8/1989 | Wolk et al. | 340/573 |
| 5,270,681 | 12/1993 | Jack | 340/427 |

OTHER PUBLICATIONS

Advertisement From Selfcare Catalog Received From Applicant on Aug. 11, 1992—No. Other Data Known at Present?.

Primary Examiner—Scott A. Rogers
Assistant Examiner—Thomas D. Lee
Attorney, Agent, or Firm—Richard L. Miller

[57] ABSTRACT

An alarm system comprises a pair of interlocking components, which when separated causes an electrical switch operable in response there to change states and activate the alarm. The switch may be either a mechanical type device or a magnetic proximity type device. A cable may be attached to one or both components.

4 Claims, 2 Drawing Sheets

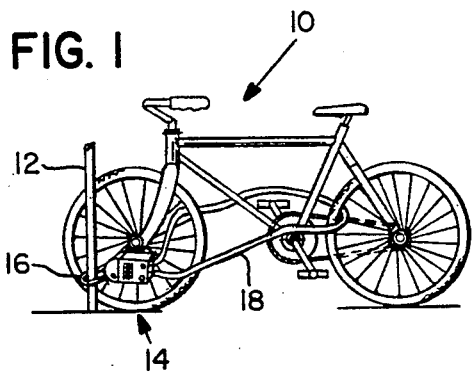
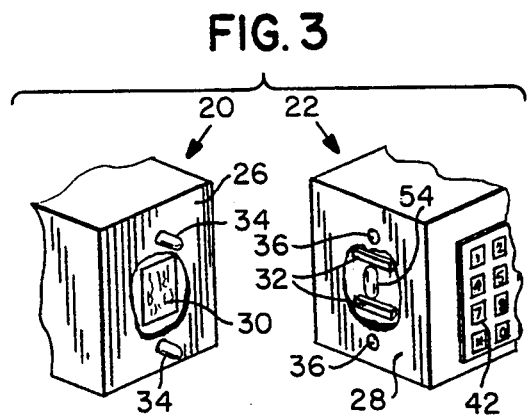
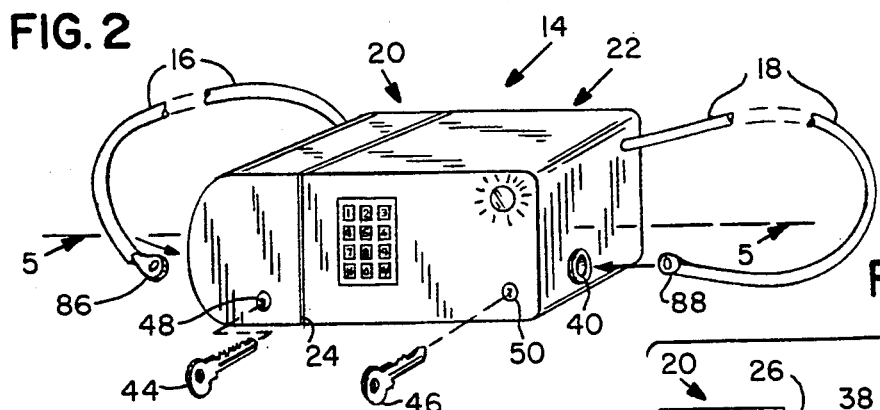
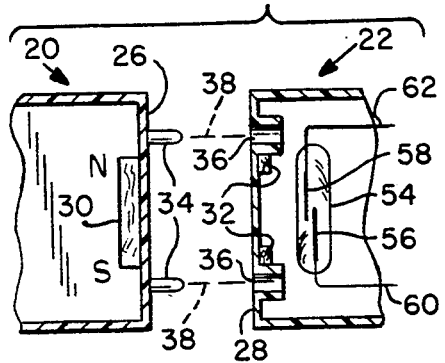
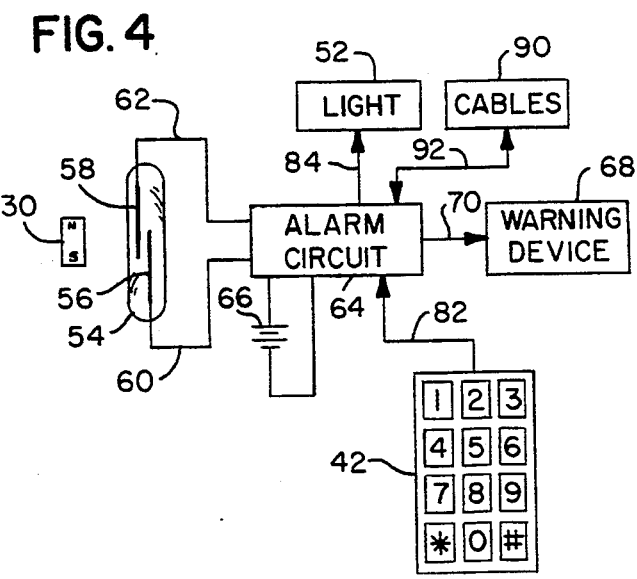
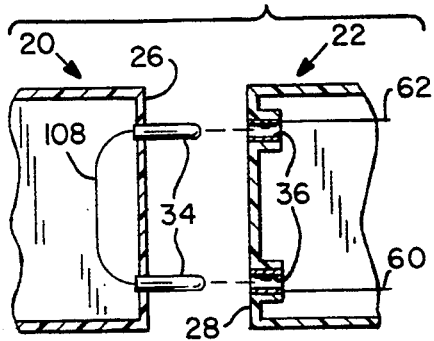

PORTABLE BREAKAWAY ALARM SYSTEM

BACKGROUND OF THE INVENTION

1. Field of the Invention

This invention relates to security devices, and particularly to an alarm system which may be physically attached to an object which it is desired to protect. If the physical integrity of the alarm system or its attaching means is compromised, an audible alarm will sound.

2. Description of the Prior Art

Alarm systems and anti-theft devices are known in the art. In general, such devices contain sensors to detect motion or a breach of integrity in the device itself or in the object being protected. The increase in sales and installation of home security systems and motor vehicle security systems is symptomatic of a society where the need for such security devices is increasing, and this need has resulted in an large number of such devices, many of which are unnecessarily expensive and complex.

There is a continuing need for simple and inexpensive security devices which can be used as an alarm when an object is disturbed or moved. Such a device is useful in many application ranging from securing a bicycle to a post or tree, to securing a cabinet door from access by a child, or sounding an alarm if a suitcase is taken from one's grasp.

There are a number of devices in the prior art that are useful for one or more of the applications listed. For example, U.S. Pat. No. 4,804,943 to Soleimani shows an alarm system for a briefcase which incorporates a radio receiver actuable by a transmitted signal to either sound an alarm or to separate the handle from the briefcase. This is one of many such security devices for briefcase which in general cause actuation of an alarm when the briefcase is removed from the grip of the authorized courier.

A device more similar to the present invention is shown in U.S. Pat. No. 4,833,456 to Heller. A motion sensor has attached thereto a conductive cable or tether which is secured around a portable object to be protected, typically a pair of skis. If continuous motion is sensed, or if the cable is disconnected, an alarm contained within the motion sensor will be activated. The device of the present invention does not rely on motion sensing, primarily because a motion sensor will often provide a false alarm if the property being protected or the security device are accidently moved.

Another security system, shown in U.S. Pat. No. 4,893,692 to Wolk et al, protects against the kidnapping of infants, but also has other applications. An rf transmitter is attached to the infant, and a receiver containing an alarm will be activated if the infant is removed from the vicinity of the receiver. In another embodiment the alarm is sounded if it is attempted to remove the transmitter from the infant.

SUMMARY OF THE INVENTION

The present invention is less complex and less expensive to manufacture than the prior art devices. Briefly, it comprises a pair of interlocking structural components, one of which contains a magnet and the other of which contains a simple electrical circuit including a magnetically actuable switch, whereby physical separation of the components causes sounding of an alarm attached to and operable in response to removal of the switch from the vicinity of the magnet.

In a further embodiment of the invention, cables may be attached to either or both of the two interlocking structural components. Attachment of the cables may be used to arm the alarm circuit, or the cables may be part of the alarm circuit such that the alarm will sound if the cable is detached or cut.

In further embodiments of the invention a keyed lock, or an electrical key pad, may be used to arm and/or disarm the alarm circuit, a light may be used to indicate arming of the device, recorded messages may be included as part of the alarm, or the two structural components may simply slide relative to each other rather than completely separate.

It is an object of this invention to provide a novel and unique alarm system for securing property against theft comprising a pair of separable components secureable to the object wherein an alarm is sounded if the components are separated.

Another object of this invention is an alarm system using a switch actuable in response to its proximity or remoteness from a magnet to determine if the security of an object has been compromised.

A further object of this invention is an alarm system having two separable components each of which has a cable attached thereto, and in which an alarm will sound if the components are separated or if the continuity of either cable is compromised.

These an other objects and a complete explanation of this invention is described in connection with the accompanying drawings.

BRIEF DESCRIPTION OF THE DRAWINGS

FIG. 1 is a diagrammatic view illustrating the present invention used to lock a bicycle to a pole;

FIG. 2 is an enlarged diagrammatic perspective view of the present invention;

FIG. 3 is a diagrammatic view with parts broken away showing the two parts of the present invention when they are separated from each other;

FIG. 4 is a circuit diagram, partially in block diagram form, showing the circuit of the present invention;

FIG. 5 is a diagrammatic cross .sectional view with parts broken away taken on line 5—5 of FIG. 2 of a first embodiment of the present invention;

FIG. 9 is a diagrammatic cross sectional view with parts broken away taken on line 5—5 of FIG. 2 of a second embodiment of the present invention;

DESCRIPTION OF THE PREFERRED EMBODIMENT

Figure 6:
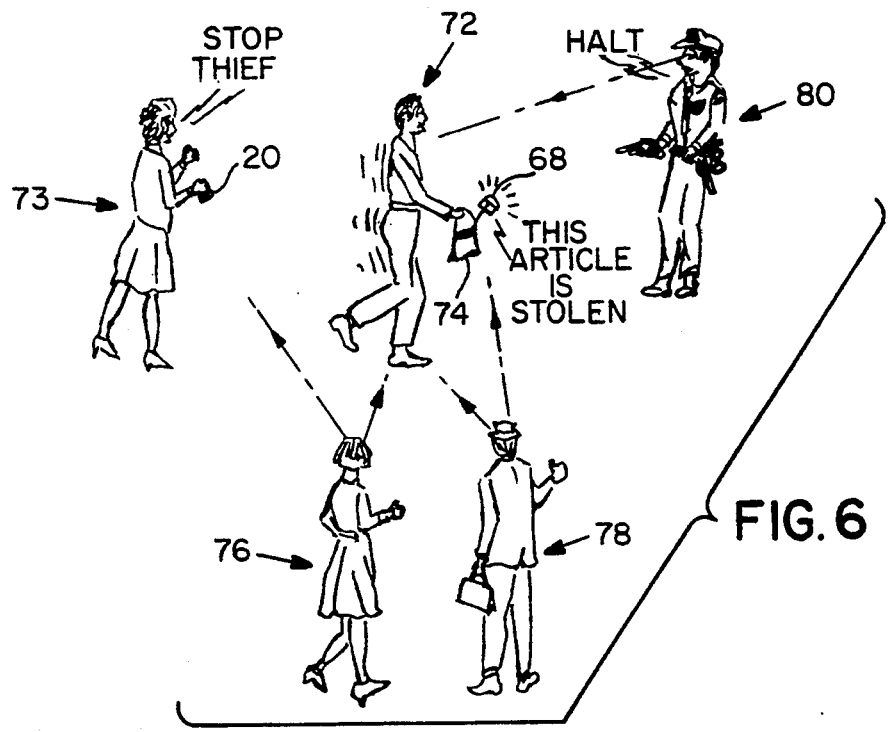
FIG. 6 is a diagrammatic view illustrating how the instant invention would perform during a theft.

Referring particularly to FIG. 1 there is shown a representative object which it desired to protect from theft, a bicycle 10, and a pole 12 to which it is secured. The alarm device which is the subject of this invention is shown generally as device 14, which will be described more fully with respect to the other drawings. A first cable 16 extends from one end of the device 14 and fits about the pole 12, and a second cable 18 extends from the opposite end of device 14 and is secured about the structural parts of the bicycle 10 such that it is impossible to remove the bicycle without cutting or otherwise removing one of the cables 16, 18 or separating the components of the device 14 as will be described, or otherwise damaging the bicycle 10 or device 14.

FIG. 2 shows device 14 in detail. It consists of two individual components 20 and 22 which fit together as shown at junction 24.

FIG. 3 shows components 20 and 22 when they are separated. Each component is preferably composes of a strong molded plastic, and can be of any convenient shape except that the walls forming junction 24, shown as wall 26 of component 20 and wall 28 of component 22, must be flat and coplanar or otherwise shaped so that the walls 26 and 28 are contiguous at junction 24. Because of the use of magnetic fields to accomplish the unique results of this invention, as will be described, the components 20 and 22 should not be made of magnetically or electrically conductive materials.

Mounted inside the component 20 and preferably flush with wall 26, as shown best in FIG. 5, is a magnet 30 such as a permanent magnet. Mounted inside component 22 and preferably flush with wall 28 is a pair of metallic bars 32 composed of a magnetically attractable material such as iron or steel. When walls 26 and 28 of components 20 and 22 are moved together physically, magnet 30 will attract bars 32 so that components 20 and 22 will be held together securely, and substantial effort is needed to separate the two components. The walls 26 and 28 are shown broken away in FIG. 3 so that the magnet 30 and bars 32 can be seen.

Shown best in FIGS. 3 and 5 are a pair of rodlike extensions 34 attached to wall 36, and a pair of corresponding openings 36 in wall 28. Openings 36 are precisely aligned with extensions 34 so that the extensions 34 fit into the openings 36 and prevent rotation or translation of components 20 and 22 relative to each other. As a result, components 20 and 22 can only be separated by forced movement of one or both components along the axis shown in FIG. 5 by dotted lines 38. The components must therefore be pulled apart and cannot accidentally be separated.

Also shown in FIG. 2 are cables 16 and 18 which extend from the components 20 and 22 respectively, and terminate in receptacles shown as numeral 40 in component 22. A similar receptacle is located on the far side of component 20. Cables 16 and 18 may be composed of any strong, flexible material, but may also be composed of an electrically conductive metal, or contain a conducting wire therein so that the cables 16 and 18 will form a part of the alarm circuit to be described.

Also shown in FIG. 2 is a key pad for arming or disarming the alarm system, and keys 44,46 which are adapted to turn locks 48,50 respectively and act as arming and/or disarming devices. A light 52 may be actuated to indicate when the alarm system is armed and in condition to be actuated.

FIG. 4 shows in schematic form the operation of the alarm system. A reed switch 54 encapsulated in an inert gas, or other similarly operable switch which is responsive to a magnetic field and switches between on and off states, is located inside component 22 (see FIG. 5) such that when components 20 and 22 are mated together, the switch 54 responds to the magnetic field generated by magnet 30. Such switches are normally closed or 'on' in the presences of a magnetic field. The two switch contacts 56,58 of switch 54 are connected via conductors 60,62 to an alarm circuit 64 which is powered by a power source 66. The alarm circuit 64 senses the opening (or closing) of switch 54 when elements 20 and 22 are separated, and sends a triggering signal to warning device 68 via conductor 70. The warning device 68 may be any known type of device which provides a warning such as a siren, a voice recording, a high pitched or wavering whistle, or the like, sufficient in time and intensity to attract attention to the fact that elements 20 and 22 have been separated, and attempted theft may be occurring.

Such operation of the warning device is shown particularly in FIG. 6 where a thief 72 has taken from a women victim 73 an object 74 (a pocketbook) to which there is attached the portion 22 of a device 14 as described herein. The warning device 68 contained in portion 22 is broadcasting the words "THIS ARTICLE IS STOLEN" attracting the attention of bystanders 76 and 78 and of police officer 80. The victim 73 is still holding the other component 20 of device 14.

Various modifications of the invention are shown in FIG. 4. The key pad 42 may be connected via line 82 to alarm circuit 64 whereby the alarm circuit 64 will not be "armed" to generate a signal actuating warning device 68 until a preprogrammed combination of numbers or symbols is entered into the key pad 42. Light 52, connected with the alarm circuit 64 via connector 84, may be turned on when the alarm circuit 64 is armed. The key pad 42 may also be used to disarm the alarm circuit 64 so that the warning device 68 cannot be actuated. The key and lock combination 44,46,48,50 may be used in addition to or in place of the key pad.

The cables 16 and 18 may be incorporated into the arming circuitry. In one embodiment the ends of the cables 16,18 shown by reference numerals 86,88 (FIG. 2), are metallic, and the alarm circuit 64 cannot be armed unless the cable ends 86,88 are secured within receptacles 40 which are preferably of conductive metal. Keys 44,46 when inserted in locks 48,50 will not permit the system to be armed unless the cables are appropriately secured into the receptacles 40.

In another embodiment of the invention the cables 16,18 contain electrical conductors and, as shown by block 90 in FIG. 4, become part of the alarm circuit 64 in that the alarm circuit 64 will actuate warning device 68 not only when switch 54 is actuated, but, once armed, the circuit 64 will actuate warning device 68 if one of the cables 16,18 is pulled out of its receptacle 40, if a cable is cut, i.e., if any discontinuity is sensed in the electrical circuit of the cables 16,18 via block 90 and conductor 92. This modification is easily accomplished, and would require an electrical connection from cable 16 through walls 26 and 28 to alarm circuit 64 and warning device 68. Such electrical connection can be accomplished via rodlike extensions 34 and openings 36, and such adaptations would be apparent to one skilled in the art.

Figure 7:
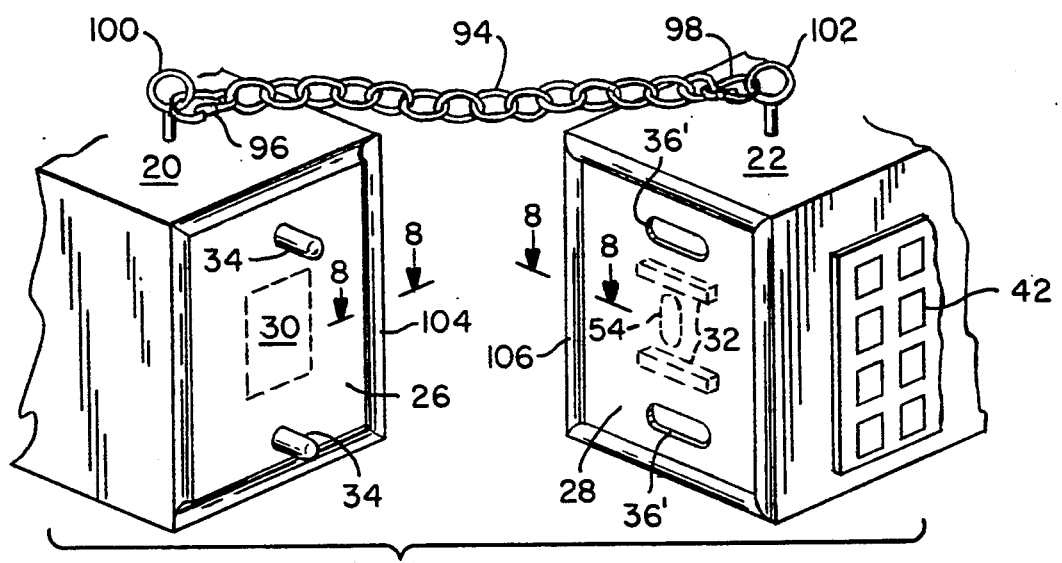
FIG. 7 is an enlarged diagrammatic view illustrating a second embodiment of the present invention.
Figure 8:
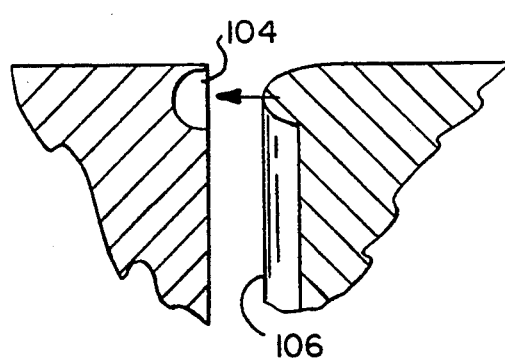
FIG. 8 is a cross sectional view taken along line 8—8 of FIG. 7.

FIG. 7 shows components 20 and 22 connected by a link chain 94 attached via dog-collar type snaps 96,98 to eyelets 100,102 located on the top of components 20 and 22. With this arrangement it is impossible for a thief to simply snatch the article being protected and escape with both the article and the component 22. This Figure also shows openings 36' in wall 28 as elliptical so that components 20 and 22 may fit together more easily. Likewise edge 104 of FIG. 7 is indented and edge 106 is raised, as shown also in FIG. 8, so that the components 20 and 22 will fit together closely. Both of these improvements permit the components to be joined more easily.

While not shown in the drawings, it is within the scope of this invention to incorporate apertures or other sound enhancing or directional components within or associated with the alarm device 14 in order to assure that the alarm initiated by warning device 68 is heard. Apertures can be placed about the periphery of component 22 or otherwise located so that the alarm cannot conveniently be muffled.

In its simplest embodiment best illustrated in FIG. 9, the cables 16,18 are not a part of the alarm device 14. A device of this sort is best used as a hidden alarm, for example to sound an alarm when a child opens a door to a cabinet which may contain something potentially harmful to a child. In this embodiment, electrical continuity is maintained only through the path completed by jumper conductor 108, rodlike extensions 34 and the pair of corresponding openings 36 having female contact surface therein which are connected to nodes 60 and 62 instead of the reed switch 54 shown in FIG. 4. As a result separation of the components 20,22 will sound the alarm, and reconnection, may or may not will terminate the alarm depending upon the initial arming code previously entered in the key pad by the authorized user, and no other arming/disarming apparatus is necessary.

When cables 16 and/or 18 are added to the device, the alarm device 14 may be attached directly to the item which it is desired to protect. The component 22 will thus remain with the item if it is stolen, better enabling the item to be recovered. The cables are preferably made of strong, flexible material, and their length may vary depending on the application. The attachment of the cable(s) may act as the arming signal to arm the alarm system, or alternatively the key units may be used as arming and/or disarming devices. Likewise simply joining the two components 20,22 can arm the system, and the keys can be used to disarm the system. Other combinations will be apparent to those skilled in the art.

The power source 66 is preferably a battery, either replaceable or rechargeable. Since the alarm system of this invention may be constructed inexpensively, it is possible that the entire assembly including the power source 66 are discardable.

Another variation of this invention is the use of with a guide, connecting components 20,22 such that the components do not actually separate but slide apart on the guide and are stopped by a catch preventing further separation. This variation would be advantageous when it is desired to maintain the item being protected in place, such as in a store selling audio or video components.

While the invention has been described with respect to its preferred embodiments, it is apparent that changes may be made to the construction and arrangement of parts without departing from the scope of the invention as hereinafter claimed.

What is claimed is:

1. An alarm system comprising:
   a) a first element having a first sidewall and having a magnet generating a magnetic:field associated therewith, said magnet being located immediately adjacent to said first sidewall;
   b) a second element having a second sidewall and having a metallic magnetically attractable material located immediately adjacent to said second sidewall;
   c) alignment means associated with both said first and second sidewall comprising first and second rodlike extension attached to and extending from one of said first and second sidewalls in spaced apart relation in the direction of said other sidewall, and said other sidewall having first and second corresponding openings for receiving respective rodlike extensions whereby, said first and second elements are interlocked with said first and second sidewalls held side by side by the attraction between said magnet and said magnetic material;
   d) alarm means associated with said second element and operable in response to physical separation of said first and second elements which results in a reduction of the magnetic field generated by said magnet said alarm means comprising:
      i) an electrical circuit including a source of power;
      ii) a switch means connected in said circuit and located immediately adjacent said second sidewall and within the magnet field of said magnet when said first and second elements are interlocked, said switch means being adapted to assume a first state when within said magnetic field, and to assume a second state when outside magnet field; and
      iii) an audible alarm connected to said switch means for sounding an alarm when said switch means assumes said second state;
   e) means for securing at least said second element to an object; and
   f) arming means comprising one of a keypad and keyed lock connected with said electrical circuit for permitting operation of said audible alarm only upon actuation of said arming means.

2. The alarm system as in claim 1 in which said securing means includes first cable means having both ends thereof attached to said first element, and second cable means having both ends thereof attached to said second element, said cable means being continuous.

3. The alarm system as in claim 2 in which at least one of said first and second cable means is electrically conductive and is connected with said electrical circuit means whereby a discontinuity in said cable means will cause actuation of said alarm means.

4. The alarm system as in claim 1 and including light means connected with said circuit means for indicating when said alarm system is armed.

* * * * *